United States Patent [19]

Ricciardelli

[11] Patent Number: 4,932,748
[45] Date of Patent: Jun. 12, 1990

[54] FIBER OPTIC LIGHT MODE MIXER

[76] Inventor: Robert H. Ricciardelli, 2213 Cottage Ct., Waukesha, Wis. 53188

[21] Appl. No.: 377,983

[22] Filed: Jul. 11, 1989

Related U.S. Application Data

[63] Continuation of Ser. No. 165,693, Mar. 9, 1988, Pat. No. 4,877,305.

[51] Int. Cl.$^5$ .............................................. G02B 6/16
[52] U.S. Cl. ............................. 350/96.30; 350/96.15
[58] Field of Search ............... 350/96.29, 96.30, 96.31, 350/96.33, 96.34, 96.15, 96.16

[56] References Cited

U.S. PATENT DOCUMENTS

| | | | |
|---|---|---|---|
| 3,969,016 | 7/1976 | Kaiser et al. | 350/96.15 |
| 4,178,069 | 12/1979 | Andersen et al. | 350/96.23 |
| 4,342,499 | 8/1982 | Hicks, Jr. | 350/96.15 |
| 4,389,090 | 6/1983 | LeFevre | 350/96.29 |
| 4,422,719 | 12/1983 | Orcutt | 350/96.30 |
| 4,877,305 | 10/1989 | Ricciardelli | 350/96.30 |

FOREIGN PATENT DOCUMENTS 0128353 10/1979 Japan.

*Primary Examiner*—John D. Lee
*Assistant Examiner*—Akm E. Ullah
*Attorney, Agent, or Firm*—Townsend and Townsend

[57] ABSTRACT

An adjustable fiber optic light mode mixer comprises a length of fiber optic material disposed in a generally circular spiral shape, the spiral having at least two coils, the coils being splayed as to be not co-planar. The fiber so disposed has a plurality of different radii, whereby modes of light transmitted by the fiber are well mixed. The mode mixer is readily adjusted by altering the shape or splaying of the coils. A method and apparatus are disclosed.

5 Claims, 1 Drawing Sheet

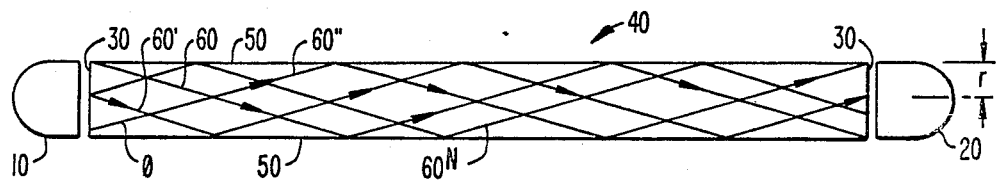
FIG._1.
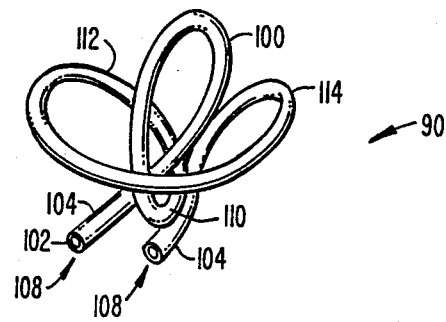
FIG._2.
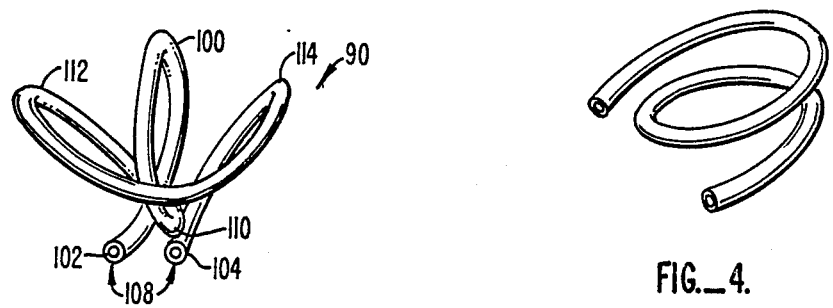
FIG._3.  FIG._4.
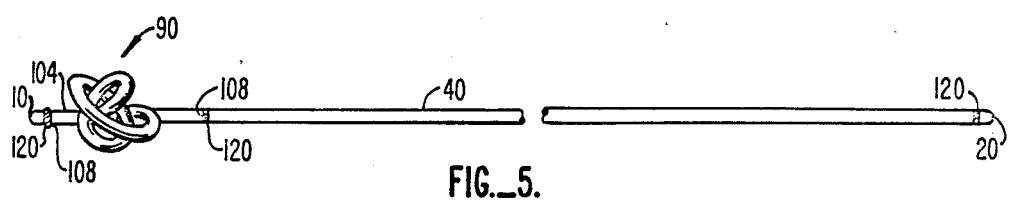
FIG._5.

FIBER OPTIC LIGHT MODE MIXER

This is a continuation of application Ser. No. 165,693 filed Mar. 9, 1988, now U.S. Pat. 4,877,305.

BACKGROUND OF THE INVENTION

1. Field of the Invention

This invention relates generally to fiber optic signal processing, and more particularly to apparatus for mixing light modes, a method for producing fiber optic mode mixers and a method for producing fiber optic mode mixing.

2. Description of the Prior Art

Transmitting light energy through a length of fiber optic tubing is analogous to transmitting energy through a waveguide. In both cases, energy reflects off the "walls" of the fiber optic tubing or the walls of the waveguide, and modes are established within the fiber optic tubing or waveguide.

FIG. 1 helps illustrate how these modes are created. A light source 10 and a light receiver 20 are coupled to end faces 30 of a length of multimodal fiber optic tube 40 having walls 50. Fiber optic tube 40 is solid, and walls 50 are the outer boundary of tube 40. A plurality of light rays 60, 60', 60", ... $60^N$ leave light source 10 and upon entering fiber optic tube 40 begin to reflect off walls 50. Although FIG. 1 shows only four such rays, it will be understood that an infinite number are present.

Depending upon the angle, $\phi$, at which light rays 60, 60', ... $60^N$ enter fiber optic tube 40, the radius, r, of fiber optic tube 40 and the wavelength of light source 10, certain rays will tend to reinforce one another, while other rays will tend to cancel each other. As a result, different modes are established within fiber optic tube 40 and transfers of energy from mode to mode can occur within fiber optic tube 40. The transfer of energy from mode to mode is termed modal dispersion. If radius r is made sufficiently small, only one mode can be supported and the fiber optic tube is said to be single mode. Generally radius r is sufficiently large to support many modes, and the fiber optic tube is said to be multimode. However, the energy will tend to concentrate in only a few modes, a situation exacerbated by bending fiber optic tube 40.

This energy concentration in a few modes is undesired when light source 10 supplies analog or digital information to a multimode fiber optic tube 40 because fidelity of the information is impaired. If, however, the various modes can be coupled or mixed within multimode fiber optic tube 40, a more even distribution of energy from mode to mode occurs and signal fidelity is improved. In practice, mode mixing is desirable because lengths of fiber optic tube 40 may be several Km in practice, and concentration of signal energy in only a few modes is inevitable. However if the modes comprising the light entering fiber optic tube 40 can be thoroughly mixed, energy will be evenly distributed and the undesired modal concentration effect in fiber optic tube 40 will be minimized.

The prior art recognizes that placing an optical fiber tube under deformation stress will modify various characteristics of the fiber. For instance, U.S. Pat. No. 4,389,090 issued to LeFevre discloses an apparatus and method for stressing an optical fiber to control the polarization of light passing through the fiber. A portion LeFevre's optical fiber is twisted to form at least one, generally planar, coil, thereby changing the polarization.

In the past, tubing containing lengths of fiber optic were filled with shot which tended to stress the fiber at uniform points along its length and to promote mode mixing. U.S. Pat. No. 4,178,069 issued to Kaiser, et al. discloses an optical fiber having an intentionally deformed waveguide axis to introduce mode coupling, thereby reducing modal dispersion.

However such prior art mode mixing maintains a constant radius, r, in the fiber optic tube and, as a result, produce incomplete mixing. Further, the characteristics of prior art mode mixers are not readily varied or easily reproduced.

SUMMARY OF THE INVENTION

Transmission of light signals through an optical fiber requires that the energy in the various modes be evenly dispersed to maintain signal fidelity. The present invention teaches a method of producing fiber optic mode mixers that have a plurality of different radii. As a result, more complete mode mixing and more uniform energy dispersion is achieved. A further advantage of the present invention is that the characteristics of the mode mixer are readily varied and uniformly reproducible.

In use, a mode mixer according to the present invention is placed between a light source and a length of fiber optic tubing through which the light signal is to be carried. The fiber optic tubing will invariably exacerbate uneven energy dispersion among the various modes due to bends in the tubing. However the mode mixer causes light entering the transmission fiber optic tubing to be well mixed, and to have relatively even energy distribution between the modes. As a result, light leaving the transmission length of fiber optic tubing suffers minimal degradation due to uneven energy dispersion.

The mode mixer of the present invention is provided by inserting a length of fiber optic material inside a length of tubing, forming the tubing into a generally circular spiral having at least two coils, and then splaying the coils so they are not co-planar. The fiber optic material so disposed has a plurality of different radii, r, causing modes of light communicated by the fiber to be well mixed. Changing the radius of one coil relative to another, or changing the splay plane of a coil relative to another, or the distance between one coil and another, produces varying characteristics in the light mode mixer. In one embodiment, no splaying is employed and the coils remains substantially co-planar.

BRIEF DESCRIPTION OF THE DRAWINGS

FIG. 1 illustrates a length fiber optic having a light source at one end and a light receiver at the other end.

FIG. 2 is a plan view of a mode mixer according to the present invention.

FIG. 3 is a side view of a mode mixer according to the present invention.

FIG. 4 is a perspective view of a substantially co-planar mode mixer according to the present invention.

FIG. 5 illustrates a fiber optic communication system, including the mode mixer according to the present invention.

DETAILED DESCRIPTION OF THE PREFERRED EMBODIMENT

With reference to FIG. 2 and FIG. 3, mode mixer 90 comprises a length of hollow tube 100 that includes within a length of fiber optic material 102. Tube 100 and fiber 102 include interchangeable input/output leads 104, each lead having a face 108. Tube 100 and fiber 102 are first shaped into a generally circular spiral comprising at least two coils, 110, 112, ... N, each coil defining a plane. At this initial construction stage, all coils are co-planar. Next, each coil 110, 112, ... N, is splayed such that none of the coils is co-planar. Although leads 104 and 106 are shown in a parallel disposition in FIG. 2 and FIG. 3, they may need not be so disposed. In the preferred embodiment, a hollow tube 100, formed preferably from a soft aluminum material because of its ease of workability, is configured to fit tightly around and contain the fiber optic material 102 to maintain the fiber 102 in a splayed spiral disposition. FIG. 4 depicts an embodiment wherein the coils are allowed to remain substantially co-planar.

As illustrated in FIG. 5, light from light source 10 is coupled to face 108 of input lead 104 of mode mixer 90 by conventional terminating connector 120. In practice, a first end of a relatively long length of fiber optic 40 is connected to face 108 of output lead 104 by conventional terminating connector 120, and a light receiver 20 is attached to the second end of fiber optic 40 by means of a conventional terminating connector 120. Light leaving mode mixer 90 and entering fiber optic 40 has the modes well mixed. As a result, bends or imperfections in fiber optic 40 will tend to disperse the modes, but because the energy in the light entering fiber optic 10 is relatively evenly dispersed among the modes, there will be minimal dispersion of the light signal received by light receiver 20. Such would not be the case if mode mixer 90 were removed from FIG. 5.

Variations in the size of each coil, or orientation of the plane of one coil relative to another, or the distance between the plane of one coil and another, allows the characteristics of the light mode mixer to be readily varied.

Variations may be made to the disclosed method and embodiment without departing from the scope of the invention as defined in the following claims. For example, different shaped configurations of tubing and fiber, or different tubing material may be used. It is possible that the tubing could be made an integral part of the fiber optic material within, such as a coating that allows the fiber optic to remain in whatever disposition it is placed.

It is to be expressly understood that the invention is not intended to be limited only to the specific examples and embodiments disclosed herein, but is defined by the appended claims.

What is claimed is:

1. A method for producing a light mode mixer from a single fiber optic material, comprising the steps of:
   establishing and maintaining a plurality of different radii within a length of single fiber optic material through which light is to be transmitted, at least a pair of the radii being oriented in non-planar relation to one another.

2. A method for producing a light mode mixer from a single fiber optic material, comprising the steps of:
   maintaining a length of the single fiber optic material, through which light is to be transmitted, in a generally circular spiral disposition, the spiral having at least two coils, each coil splayed so as not be co-planar with another coil.

3. A method for producing a light mode mixer from a single fiber optic material, comprising the steps of:
   inserting a length of the single fiber optic material inside a hollow tube;
   forming the tube and fiber within into a generally circular spiral having at least two coils;
   splaying the coils so that they are not co-planar to each other.

4. A method for producing a light mode mixer from an optical fiber, comprising the steps of:
   inserting a length of the optical fiber inside a hollow tube;
   forming the tube and fiber within into a generally circular spiral having at least two, generally non-planar, coils.

5. An apparatus for mixing modes of light transmitted through an optical fiber, comprising:
   means for creating and maintaining a plurality of different radii within a length of fiber optic material through which light is to be transmitted.

* * * * *